United States Patent Office 3,764,393
Patented Oct. 9, 1973

3,764,393
STORAGE BATTERY AND A METHOD OF PRODUCING THE SAME
Tadasu Fujimoto, Takatsuki, Japan, assignor to Yuasa Battery Company Limited, Takatsuki, Osaka Prefecture, Japan
Filed Jan. 19, 1972, Ser. No. 218,868
Claims priority, application Japan, Sept. 25, 1971, 46/74,815
Int. Cl. H01m 5/00
U.S. Cl. 136—134 R
9 Claims

ABSTRACT OF THE DISCLOSURE

This invention relates to a storage battery wherein a connecting conductor formed integrally with a strap of a plate group contained in one cell of a battery case partitioned into a plurality of cells and a similar connecting conductor in an adjacent cell are electrically connected with each other through an aperture in the partition made of a synthetic resin between the cells, and the connecting conductor on the side of at least one of the adjacent cells is formed by embedding in advance a synthetic resin molding to be liquid-tightly bonded with the above mentioned partition in such electrically conductive metal as, for example, lead or a lead alloy, and particularly to improvements in the construction of an intercell electric connection for such storage batteries and a process for producing the same. This is to make favorable electrical connection between cells through an aperature in the partition and is very effective to prevent any leakage through the aperature.

---

This invention relates to storage batteries and more particularly to improvements in the construction of an intercell electrical connection for multicell batteries.

In the prior art a storage battery is known wherein battery straps of respective cells are integrally formed as a well known intercell electrical connection, a projection of a connector lug made of lead or a lead alloy is inserted through an aperture in a partition in a battery case and is electrically resistance-welded under pressure so that the plate groups of the respective cells may be electrically connected and the aperture in the partition may be sealed. However, the aperture in the partition of such battery is only filled with the electrically conductive metal body made by melting the projection and therefore the aperture wall and the above mentioned electrically conductive metal body are bonded with each other only by a plane contact of both. Therefore, a gap results between them because of a vibration or corrosion while the storage battery is being used and, as a result, there is a defect that the seal is so imperfect that the leakage of the electrolyte can not be perfectly prevented. In order to eliminate this defect to some extent, there is further suggested a method wherein a ring made of the same kind of lead or lead alloy is formed integrally with a connecting lug so as to enclose an aperture in a partition and is pressed into the partition. Therein, too, the annular ring itself is often formed so non-uniformly that there will be a leakage and further, as the ring is pressed into the partition the partition will be cracked and, after all, the sealing will fail and the problem of preventing the leakage can not be perfectly solved. Further, it is a fatal defect that, in the event the partition is very thin, such method can not be applied. The present invention is to eliminate all the above mentioned defects.

The principal object of the present invention is to provide a novel storage battery wherein respective cells are electrically connected with each other through an aperture in a partition in a battery case and, at the same time, any leakage between the adjacent cells through the aperture in the partition is perfectly prevented.

Another object of the present invention is to provide a novel storage battery wherein an electrical intercell connection in a very thin battery partition can be made with a perfect seal.

A further object of the present invention is to provide a novel storage battery which is so easy to make that a low cost can be expected.

These objects of the present invention will be easily understood with reference to the following descriptions and drawings.

Figure 1:
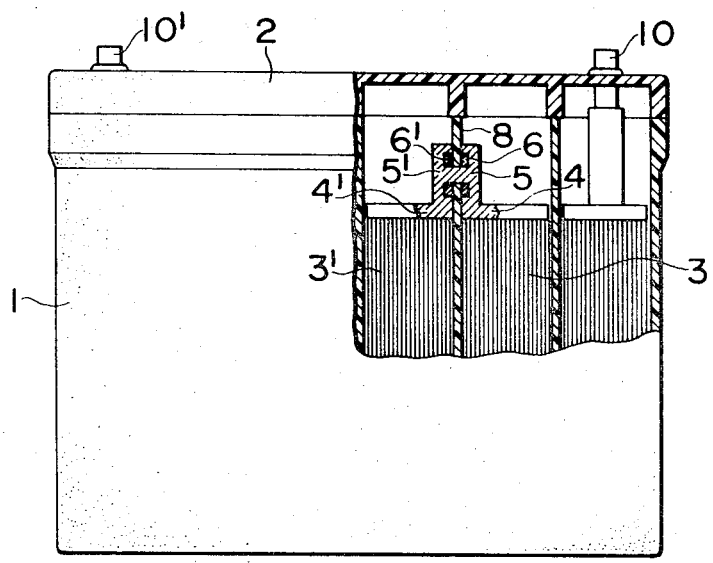
FIG. 1 is a partly sectioned view of a storage battery showing an embodiment of the present invention.
Figure 2:
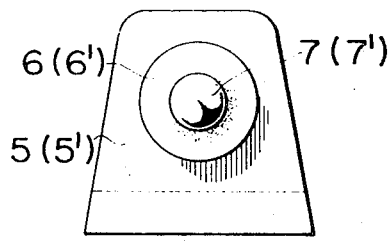
FIG. 2 is an enlarged, partial elevation of a connecting conductor in which a synthetic resin molding is embedded.
Figure 3:
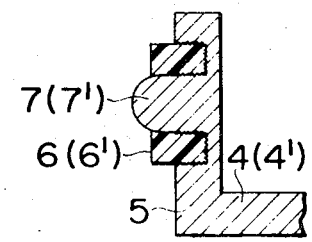
FIG. 3 is a sectioned side view of FIG. 2.
Figure 4:
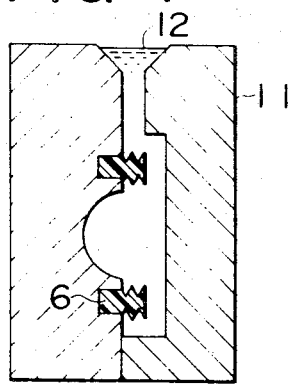
FIG. 4 is a partly sectioned view of an embodiment in which a synthetic resin molding is embedded in a connecting conductor.
Figure 5:
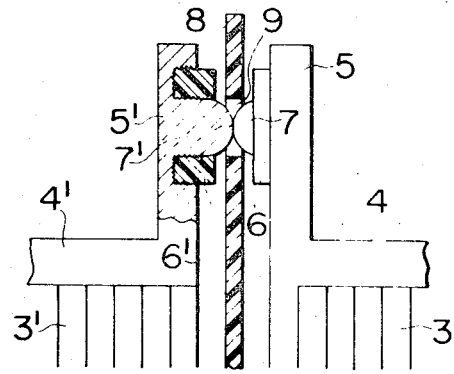
FIG. 5 is an enlarged partly sectioned view showing connectors of respective cells before being connected with each other through an aperture in a partition in a battery case.

In FIG. 1, 1 is a battery case made of a synthetic resin, 2 is a lid of the same, 3 is a positive plate group contained in one cell, 3' is a negative plate group contained in an adjacent cell, and 4 and 4' are respective straps of the positive plates 3 and negative plates 3'. As shown in FIGS. 2 and 3, 5 and 5' are connecting conductors formed integrally with the respective straps 4 and 4', having had respective annular synthetic resin moldings 6 and 6' embedded in them and having respective projections 7 and 7'. 8 is a partition in the battery case 1. 9 is an aperture in the partition. 10 and 10' are terminal posts. The above mentioned connecting conductors 5 and 5' are obtained by such process as in the following. When molding 6 as, for example, of a thermoplastic synthetic resin of a melting point lower than of such electrically conductive metal as lead or a lead alloy is first inserted into a casting mold 11 and a molten solution 12 of the above mentioned electrically conductive metal is poured into said casting mold 11, the molding 6 of the above mentioned synthetic resin will be melted on a part of the surface by the heat of said molten metal to make a combination in which the above mentioned molding 6 and electrically conductive metal are zigzag closely bonded with each other after solidifying, that is, a combination in which the synthetic resin molding is cast to be embedded in the connective conductor of the electrically conductive metal by the process in FIG. 4. This is shown by zigzag lines in FIGS. 5, 6, 7, 8, 9, 10 and 11. This teaches that the above mentioned molding and electrically conductive metal are perfectly sealed with each other without allowing the penetration of the electrolyte on their bonding surfaces at all. Generally a combination of a metal and synthetic resin is produced by a process wherein a metallic molding of a fixed shape is inserted into a molding metallic mold and then a thermoplastic synthetic resin is pressed into the above mentioned metallic mold with an injection-molding machine. However, in such process, as a thermoplastic synthetic resin having a melting point lower than the melting point of a molding made of a metal is pressed in around the above mentioned metallic molding, the metallic molding will not be melted on the surface and, as a result, there have been defects that the boundary surfaces of the thermoplastic synthetic resin and the metal will be only in plane contact and will be so low in the adhesion as to peel off each other, and that the electrolyte will penetrate between the boundary surfaces and will corrode the metal.

The connecting conductor of the present invention has eliminated such defects as already described and is one of the most important features of the present invention. However, even if a connecting conductor which is made of a combination of a metal and molding by the above mentioned general producing process, that is, in which a synthetic resin molding is embedded is used, the effect of the present invention will be obtained though to a different degree. It is evident that such conductor is within the scope of the present invention. Then, as clearly shown in FIGS. 5 and 6, the synthetic resin 6 or 6' in which the connecting conductor 5 or 5' is cast to be embedded will be heat-sealed to be perfectly fused together with the wall around the aperture in the partition made of a synthetic resin and, as a result, there will be no leakage at all. This is a structure which can be applied also to thin partition walls and is another important feature of the present invention.

Now, the present invention will be more easily understood from the following explanation of the assembly of a storage battery according to the present invention.

Figure 6:
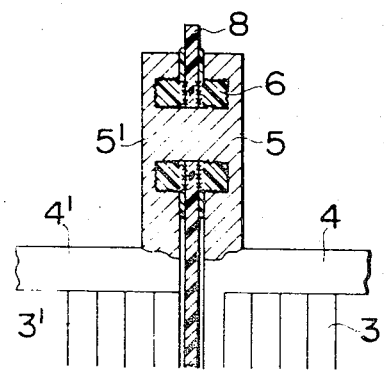
FIG. 6 is an enlarged partly sectioned view showing the connectors in FIG. 5 as connected.

As shown in FIG. 1, the plate group 3 or 3' made integral with the strap 4 or 4' is contained in each cell partitioned with the partition 8 in the battery case 1. As evident from FIG. 5, the connecting conductor 5 or 5' formed integrally with the above mentioned strap 4 or 4' has the projection 7 or 7' inserted through the aperture 9 before being connected. Then, when a heater of a proper shape (not illustrated) is inserted between the wall of the partition 8 and the synthetic resin molding 6 or 6' to heat both of them and, substantially simultaneously with removing said heater, an electrode (not illustrated) of a resistance-welding machine is brought into contact with the back of the connecting conductor 5 or 5' to pass electricity under pressure, the projections 7 and 7' of the connecting conductors 5 and 5' will be able to be welded with each other and, at the same time, the wall of the partition 8 and the synthetic resin molding 6 or 6' will be integrally fused together as shown in FIG. 6 as connected.

After the connection of the cells is completed, the lid of the battery case is then fitted by a heat-sealing process or the like as well known.

Figure 7:
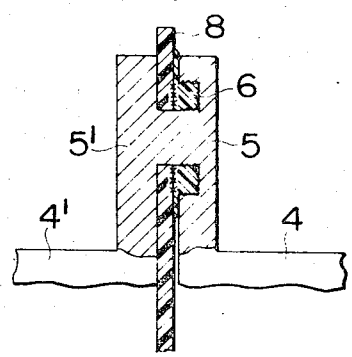
FIG. 7 is a partly sectioned side view showing a modification of the present invention.
Figure 8:
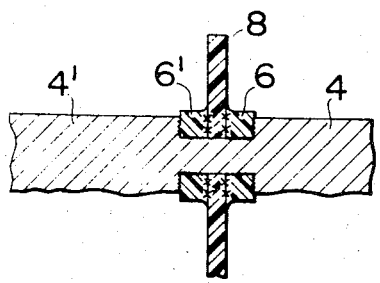
FIGS. 8, 9, 10 and 11 are partly sectioned side views showing other modifications.
Figure 9:
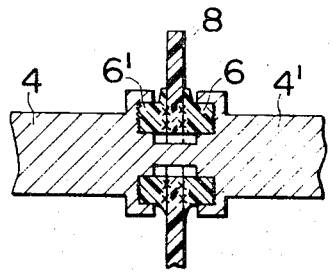
Figure 10:
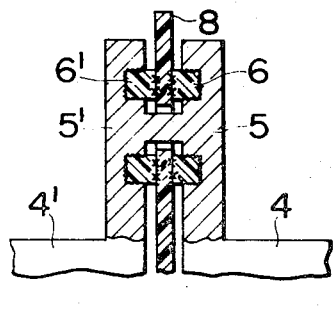
Figure 11:
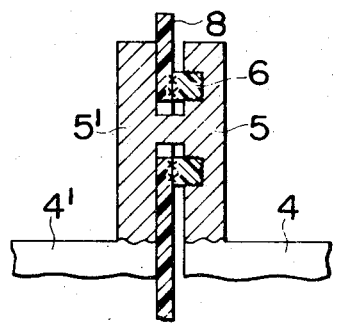

FIG. 7 shows a modification of the present invention wherein the synthetic resin molding 6 is provided in only one of the connecting conductors to be connected. Each of FIGS. 8 and 9 is another modification of the present invention wherein the connecting conductor is formed horizontally integrally with the strap. In such case, the connecting conductor will be so remarkably shortened that the material will be saved. Particularly, in FIG. 9, a gap is made between the partition aperture and connecting conductor so that such electrically conductive metal as, for example, lead or a lead alloy may be saved. In FIGS. 10 and 11, a gap is made between the connecting conductor and the aperture or wall of the partition so that the lead or lead alloy may be saved in the same manner as in FIG. 9. Particularly, in FIG. 11, the synthetic resin molding 6 is provided in the connecting conductor of only one cell. In FIGS. 9, 10 and 11, even if the gap between the partition aperture and the connecting conductor 5 or 5' is located in or near the aperture, if the synthetic resin molding embedded in the connecting conductor and the partition wall are perfectly fused together, it will be perfectly effective to prevent any leakage.

Figure 12:
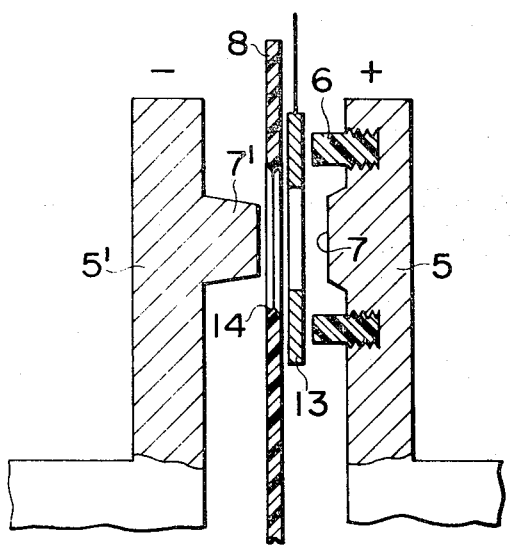
FIGS. 12 and 13 are sectioned side views showing a producing process of another embodiment of the present invention.
Figure 13:
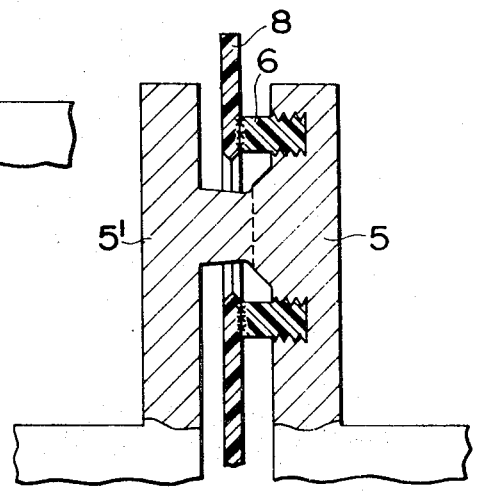

Each of FIGS. 12 and 13 is a partly sectioned view showing particularly a connecting part between cells in a process of another embodiment of the battery according to the present invention. That is to say, an annular synthetic resin molding 6 is embedded in the connecting conductor 5 on the positive side of the plate group by a casting process as in FIG. 4 and the projection 7 enclosed with this molding 6 is so made as to project a little out of the other surface of the connecting conductor 5 but to be inner than the molding 6. The synthetic resin molding 6 and a partition 8 are heated with a surface heater 13 on the corresponding surface of them so as to be partly melted, said molding is pushed against the partition 8 so that the aperture part 14 of the partition may fit the projection in the molding as in FIG. 13 and is liquid-tightly bonded with the partition by heat-sealing. In such case, as the projection is inward of the molding, the bonding of the molding with the partition will not be obstructed but will be able to be made simply and positively. Now, the projection 8' of the connecting conductor 5' on the negative side of the plate group of the adjacent cell is so made as to contact the projection 7 on the positive side through the aperture in the partition and both projections are resistance-welded together under pressure with electrodes of a resistance-welding machine (not illustrated). In such case, if the aperture 14 in the partition is a little larger in the diameter than the projection 7' on the negative side to leave a small gap, even if there is a dimensional difference in the plate group and connecting conductor, the projection will be able to be simply inserted into the aperture in the partition and therefore the assembling operation will be simple and efficient. Further, the fact that the projection on the negative side is made longer than the projection on the positive the projection on the positive side and is so made as to reach the projection on the positive side through the aperture in the partition serves to prevent the projection from being made fine by corrosion, because the negative side will be less corroded than the positive side.

Further, as the aperture in the partition is so inclined as to expand outward from inside the partition, neither liquid nor gas will remain in the aperture and therefore the aperture will be prevented from being corroded. Further, if the part of the synthetic resin molding to be embedded in the connecting conductor is designed to be irregular as shown in FIG. 12 or FIG. 13, the effect of the liquid-tightness will be duplicated and the molding itself will be positively retained in the connecting conductor.

As described above, the storage battery of the present invention is not intended to seal the aperture itself in the partition in such intercell electric connection as is already well known but is to perfectly prevent any leakage between the adjacent cells by applying novel connecting conductors made by embedding in advance a synthetic resin molding in an electrically conductive metal and liquid-tightly bonding said connecting conductor with the wall of the partition of the same material as of said molding. In the present invention, particularly, the intercell electric connection can be applied even to a thin partition. Further, as the aperture itself is not to be sealed, it will be enough to use a small amount of such electrically conductive metal as, for example, lead or a lead alloy in or near the aperture, therefore it will be possible to save the material to be used and a cheap storage battery will be able to be obtained.

The embodiments and modifications described herein are only some examples. It is needless to say to be obvious that any other modifications can be made without deviating from the spirit of the present invention.

For example, if the already described synthetic resin molding is formed to be irregular or coarse on the surface in advance, the adhesion of said molding with the lead or lead alloy will be higher. If the bonding of the synthetic resin molding and partition wall with each other is to be liquid-tight, a binder may be used instead of the heat-seal. Further, instead of the projection of the connecting conductor, a connecting piece may be interposed in the aperture in advance.

What is claimed is:

1. A storage battery wherein a connecting conductor formed integrally with a strap of a plate group contained in one cell of a battery case partitioned into a plurality of cells and a similar connecting conductor in an adjacent cell are electrically connected with each other through an aperture in the partition made of a synthetic resin between cells, and a synthetic resin molding surrounding the connecting conductor is bonded with said partition on the side of at least one of the adjacent cells, said resin molding being embedded in the connecting conductor.

2. A storage battery according to claim 1 wherein said connecting conductor is of a metal of one of lead and lead alloy.

3. A storage battery according to claim 1 wherein said resin molding is bonded with the partition by heat-sealing.

4. A storage battery according to claim 1 wherein said connecting conductor has a gap between it and the partition in and near the aperture in the partition.

5. A storage battery according to claim 1 wherein said resin molding is bonded to the partition from the connecting conductor on the positive side.

6. A storage battery according to claim 1 wherein said connecting conductor is formed integrally with the strap in the same horizontal direction.

7. A storage battery according to claim 1 wherein said connecting conductor in which said synthetic resin is embedded is formed by molten metal poured into a casting mold in which said synthetic resin molding was inserted said molten metal solidifies.

8. A storage battery according to claim 1 wherein said synthetic resin molding is in the form of a ring-shape.

9. A process for producing storage batteries comprising a step of containing a plate group in each cell of a battery case partitioned into a plurality of cells, said plate group having a strap and a connecting conductor formed integrally and an annular synthetic resin molding being embedded in the connecting conductor on the positive side so as to enclose a projection made to be inner than said molding, a step of heating the above mentioned molding and a partition with a heater so as to be partly melted, a step of pushing said molding so as to enclose the aperture in the partition and heat-sealing it to be liquid-tightly bonded and fixed and a step of resistance-welding under pressure the projection of the connecting conductor on the negative side of the adjacent cell while keeping it in contact with the projection on the positive side through an aperture in the partition.

References Cited

UNITED STATES PATENTS 3,476,611   11/1969   Sabatino _____ 136—134 R

FOREIGN PATENTS 1,090,075   11/1967   Great Britain _____ 136—134 R
1,116,456   6/1968   Great Britain _____ 136—134 R
7,890   3/1970   Japan _____ 136—134 R DONALD L. WALTON, Primary Examiner U.S. Cl. X.R.

136—176